(12) United States Patent  
Myhrvold et al.

(10) Patent No.: US 9,294,742 B2  
(45) Date of Patent: Mar. 22, 2016

(54) SPECTRAL IMPROVEMENT OF DIGITAL CAMERA COLOR IMAGES

(71) Applicant: Searete LLC, Bellevue, WA (US)

(72) Inventors: Nathan P. Myhrvold, Bellevue, WA (US); Clarence T. Tegreene, Mercer Island, WA (US)

(73) Assignee: THE INVENTION SCIENCE FUND I, LLC, Bellevue, WA (US)

( * ) Notice: Subject to any disclaimer, the term of this patent is extended or adjusted under 35 U.S.C. 154(b) by 45 days.

(21) Appl. No.: 14/288,168

(22) Filed: May 27, 2014

(65) Prior Publication Data

US 2014/0267846 A1      Sep. 18, 2014

Related U.S. Application Data

(63) Continuation of application No. 12/218,230, filed on Jul. 11, 2008, now Pat. No. 8,736,709.

(51) Int. Cl.
  *H04N 9/04* (2006.01)
  *H04N 9/73* (2006.01)
  *H04N 5/225* (2006.01)

(52) U.S. Cl.
  CPC ............ *H04N 9/045* (2013.01); *H04N 5/2256* (2013.01); *H04N 9/735* (2013.01)

(58) Field of Classification Search
  CPC ...... H04N 9/045; H04N 5/2256; H04N 9/735
  USPC ........................................................ 348/272
  See application file for complete search history.

(56) References Cited

U.S. PATENT DOCUMENTS

| | | | |
|---|---|---|---|
| 6,839,088 B2 | 1/2005 | Dicarlo et al. | |
| 6,931,152 B2 | 8/2005 | Spitzer | |
| 7,193,587 B2 | 3/2007 | Yu et al. | |
| 8,253,824 B2 | 8/2012 | Benezra et al. | |
| 2003/0053688 A1 | 3/2003 | Spitzer | |
| 2004/0109077 A1 | 6/2004 | Abdellatif | |
| 2005/0018223 A1* | 1/2005 | Debevec ............. | H04N 1/603 358/1.9 |
| 2006/0092444 A1 | 5/2006 | Nakamura et al. | |
| 2006/0103728 A1* | 5/2006 | Ishigami ............. | H04N 1/6027 348/180 |
| 2006/0109351 A1 | 5/2006 | Ishii et al. | |
| 2006/0139479 A1* | 6/2006 | Dicarlo .............. | H04N 1/6033 348/370 |
| 2006/0170994 A1 | 8/2006 | MacKinnon et al. | |

(Continued)

FOREIGN PATENT DOCUMENTS

JP   2003-520515 A   7/2015
WO   WO 2007/015765 A2   2/2007

OTHER PUBLICATIONS

Chinese State Intellectual Property Office; Office Action; Chinese Application No. 200980134899.3; Oct. 25, 2012; pp. 1-8; (No English translation provided).

(Continued)

*Primary Examiner* — Gevell Selby

(57) ABSTRACT

Systems and methods for modifying a color image of a scene are provided. The systems and methods involve illuminating at least a portion of the scene with a light having a known spectral power distribution, and detecting a finite number of spectral components of light received from the scene under such illumination. The detected values of spectral components of light received from the scene are used to modify the color image or rendition of the scene.

32 Claims, 8 Drawing Sheets

(56) References Cited

U.S. PATENT DOCUMENTS

2006/0291532 A1 12/2006 Wyatt
2007/0013812 A1 1/2007 Ajito et al.

OTHER PUBLICATIONS

"Order of Adjectives in a Series"; English for Students, English Glossary; printed on Feb. 14, 2011; pp. 1-2.

"Camera and Scanner Profiles: Gamuts and Mapping to Working Color Spaces"; Gamutvision; pp. 1-8; located at: http://www.gamutvision.com/docs/camera_scanner.html.

"Color Correction for Image Sensors"; Kodak: Image Sensor Solutions; dated Oct. 27, 2003; pp. 1-4; located at: http://www.kodak.com/ezpres/business/ccd/global/plugings/acrobat/en/supportdocs/ColorCorrectionforImageSensors.pdf.

PCT International Search Report; International App. No. PCT/US09/04041; Aug. 27, 2009; pp. 1-2.

* cited by examiner

FIG. 6

METHOD 600

602
Establish the different types of scene illuminations and a corresponding number of different sets of spectral components of light to be detected by the imaging device for rendering an improved color image of a particular scene

610
In a second scene illumination, illuminate at least a portion of the scene with a light component having a known spectral power distribution

612
In third or more scene illuminations, illuminate the same or other portions of the scene with the same or other light components having known spectral power distributions

620
Detect a finite number of spectral components of light received from the scene under such illumination (s)

630
Modify the color image or rendition of a scene according to the detected values of finite number of spectral components

FIG. 7

Method 700

710
In response to the control signal, process a plurality of sets of values of spectral components of light received from the scene under a corresponding plurality of scene illuminations 720
Render the color image of the scene based at least in part on the detected spectral components of light received from the scene under the first and second scene illuminations, the characteristic spectral response functions of the imaging device, and the known spectral distribution of light in the second scene illumination

FIG. 8

Method 800

810
Illuminate at least a portion of the scene with at least a light component having a known spectral power distribution

820
Record a spectral response of the imaging device to light received from the scene under the second scene illumination

830
Adjust characteristic spectral response function of the imaging device according to the recorded spectral response of the imaging device to light received from the scene under the second scene illumination

SPECTRAL IMPROVEMENT OF DIGITAL CAMERA COLOR IMAGES

TECHNICAL FIELD

The present application relates, in general, to color imaging technology. In particular, the application relates to the spectral content of images.

BACKGROUND

Color is a psychological phenomenon based on the interaction of the spectrum of light (distribution of light energy versus wavelength) with light receptors in the eye, which have specific sensitivities for specific spectral wavelength bands or regions (hereinafter "spectral components") of light. Color categories and physical specifications of color are also associated with objects, materials, light sources, etc., based on their physical properties such as light absorption, reflection, or emission spectra.

In the physical sense, a color is the ratio of intensities measured in different spectral components of the electromagnetic spectrum. In the physiological sense, in humans, the different spectral components are defined by the spectral sensitivity curves of three different types of receptors in the eye (i.e., the so-called red, blue, and green cones). The human brain processes and combines signals from the red, blue and green cones to create a composite impression or image of a scene. All colors in the scene are perceived as combinations of the red, blue and green cone signals. The range or gamut of colors that are perceived by humans is represented, for example, by the CIE 1931 chromaticity diagram (FIG. 5).

Man-made color image sensors (e.g., color film, or digital cameras using CCD or CMOS sensors) also sense light intensities in a finite number of distinct spectral components. Various types of color image sensors differ in how they separate and measure the distinct spectral components. For example, a color film may have a stack of three different emulsion layers that are exposed by red, green, and blue components of light, respectively. A digital camera may use an array of layered sensors so that every pixel, like a color film, contains a stack of sensors sensitive to individual colors (e.g., sensor available under the Foveon trademark). More commonly, digital cameras use a spatial color filter array (e.g., a Bayer filter) positioned on top of a CMOS or CCD sensor to capture different spectral components of light in corresponding nominal pixel types.

The man-made color image sensors sense and collect intensity data for each distinct spectral component received from a scene. The data for each spectral component is monochrome, i.e., it includes only intensity information, but no color information. To create an approximate color image or rendition of a scene, the different intensity data for the distinct spectral components are processed, encoded to certain colors and intensities, and combined.

The color image or rendition is an approximation, at least in part, because the collected intensity data does not include full or complete information on the spectral distribution of light received from the scene. The intensity data on the spectral distribution of light received from the scene is limited by, for example, the finite number of spectral components sensed, the shape and the widths of the sensor spectral sensitivities for each spectral component, and overlap of the spectral sensitivities for the different spectral components. FIG. 3 shows the red, blue and green spectral responses of an exemplary CMOS sensor with a RGB color filter. Consideration is now being given to ways of increasing or supplementing the color image data with more information on the spectral distribution of light received from the scene.

SUMMARY

Systems, apparatuses, and methods for modifying the spectral information content of color images are provided.

An exemplary system for modifying a spectral response representation of a scene obtained by an imaging device includes an apparatus having a supplemental illumination device and/or data processing circuitry.

The supplemental illumination device is operable to illuminate the scene with light having a spectral distribution for which at least some qualifying information is available (e.g., "a known spectral distribution").

The data processing circuitry renders a color image of the scene by processing a plurality of sets of spectral components of light received from the scene under a corresponding plurality of scene illuminations including at least an illumination with light having a known spectral distribution, respectively. The rendered color image of the scene may be based at least in part on the detected spectral components of light received from the scene under the scene illuminations, the characteristic spectral response functions R ($\lambda$) of the imaging device, and the known spectral distribution of light in at least an illumination.

Methods for improving a color image or rendition of a scene may utilize additional scene information developed by illuminating the scene with light having a known spectral distribution.

An exemplary method relates to improving a color image or scene rendition, which may have been obtained under a first scene illumination. The method involves illuminating at least a portion of the scene in a second scene illumination with a light component having a known spectral power distribution, detecting a finite number of spectral components of light received from the scene under such illumination, and modifying the color image or rendition of the scene according to the detected values of the finite number of spectral components of light received from the scene under such illumination.

Another exemplary method relates to rendering a color image of a scene. The method involves processing a plurality of sets of values of spectral components of light received from the scene under a corresponding plurality of scene illuminations including a first and a second scene illumination. The method further includes rendering the color image of the scene based at least in part on the values of the spectral components of light received from the scene under the first and second scene illuminations, the characteristic spectral response functions of an imaging device that was used to detect of the spectral components of light received from the scene, and the known spectral distribution of light in the second scene illumination.

The foregoing summary is illustrative only and is not intended to be limiting. In addition to the illustrative aspects, embodiments, and features described above, further aspects, embodiments, and features of the solutions will become apparent by reference to the drawings and the following detailed description.

BRIEF DESCRIPTION OF THE FIGURES

In the accompanying drawings:

FIG. 6 is a flow diagram illustrating an exemplary method for improving a color image or scene rendition, in accordance with the principles of the solutions described herein;

FIG. 7 is a flow diagram illustrating an exemplary method for rendering a color image of a scene in response to control or command signal, in accordance with the principles of the solutions described herein; and FIG. 8 is a flow diagram illustrating an exemplary method for adjusting a characteristic spectral response function of an "in use" digital imaging device, in accordance with the principles of the solutions described herein.

Throughout the figures, unless otherwise stated, the same reference numerals and characters are used to denote like features, elements, components, or portions of the illustrated embodiments.

DETAILED DESCRIPTION

Figure 1:
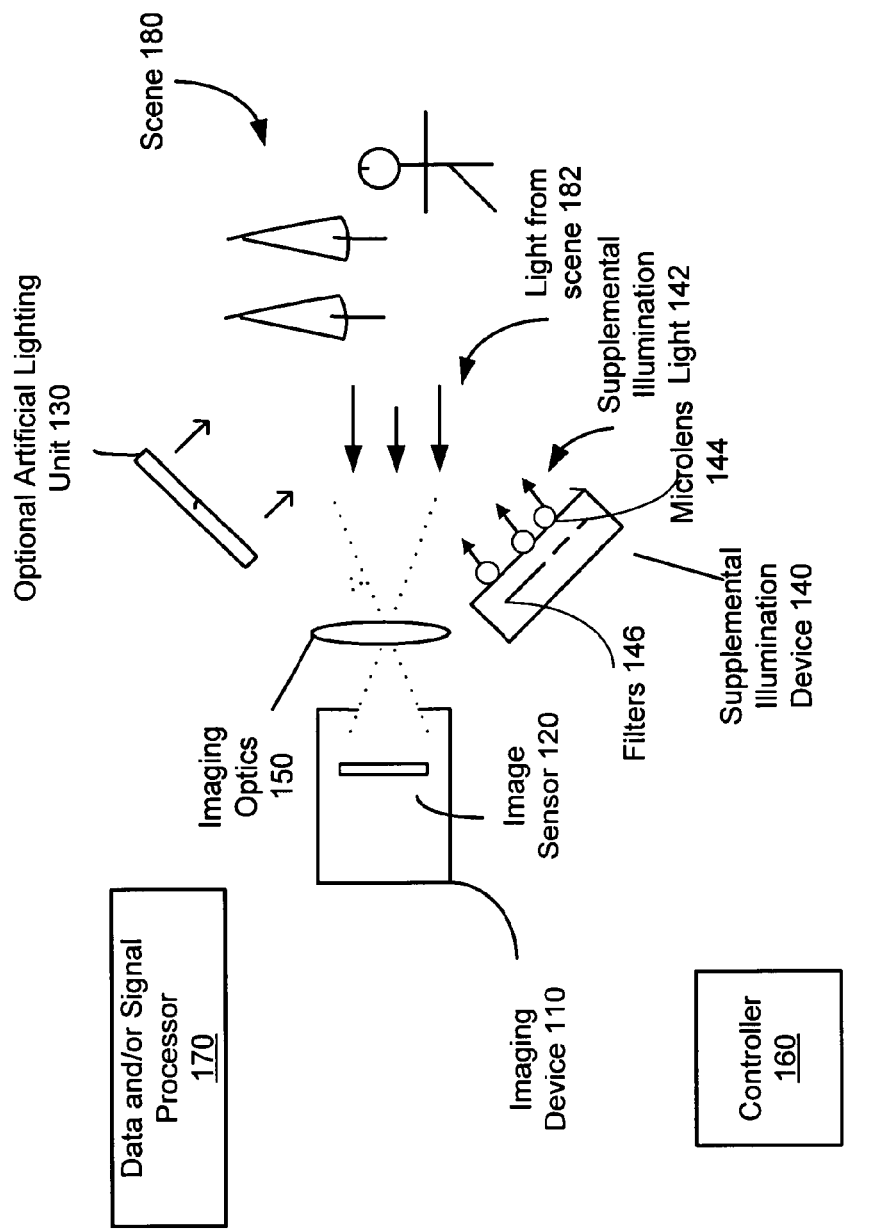
FIG. 1 is a block diagram illustrating an exemplary system for acquiring a color image or rendition of a scene, in accordance with the principles of the solutions described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The terms "image" and "rendition of a scene" as used herein will be understood to include, without limitation, reference to image and scene rendition data and/or signals, respectively. The terms may also, in context, refer to display or output of such data and/or signals. More generally, any nominal term used herein to refer to a physical, mathematical, conceptual, perceptual, abstract object or aspect (e.g., spectral power distribution, spectral components of light, spectral response functions, etc.) will be understood to include, without limitation, reference to data and/or signals, or other tangible representations of the named object or aspect.

A system for acquiring spectral characteristics of a scene under a first scene illumination includes an imaging device configured to detect a finite number (N) of spectral components of light received from the scene, a supplemental illumination device operable to provide a second scene illumination with light having a known spectral distribution, and processing circuitry to produce a signal indicative of a spectral power distribution response characteristic of the scene. The processing circuitry is responsive to the detected spectral components of light received from the scene under the first and second scene illuminations, characteristic spectral response functions $R_n(\lambda)$, n=1, ... N of the imaging device, and the known spectral distribution of the light provided by the supplemental illumination device.

FIG. 1 shows an exemplary system 100 for acquiring a color image or rendition of a scene 180 under a first scene illumination. The first scene illumination may include ambient and/or artificial lighting provided by an optional artificial lighting unit 130. Light 182 received from the scene (e.g., light reflected, transmitted, or emitted by the scene) may have a spectral power distribution (SPD($\lambda$)), which is characteristic of the scene.

Exemplary system 100 includes an imaging device 110, a supplemental illumination device 140, and optional control and processing circuitry (e.g., controller 160 and data processor 170).

Figure 4:
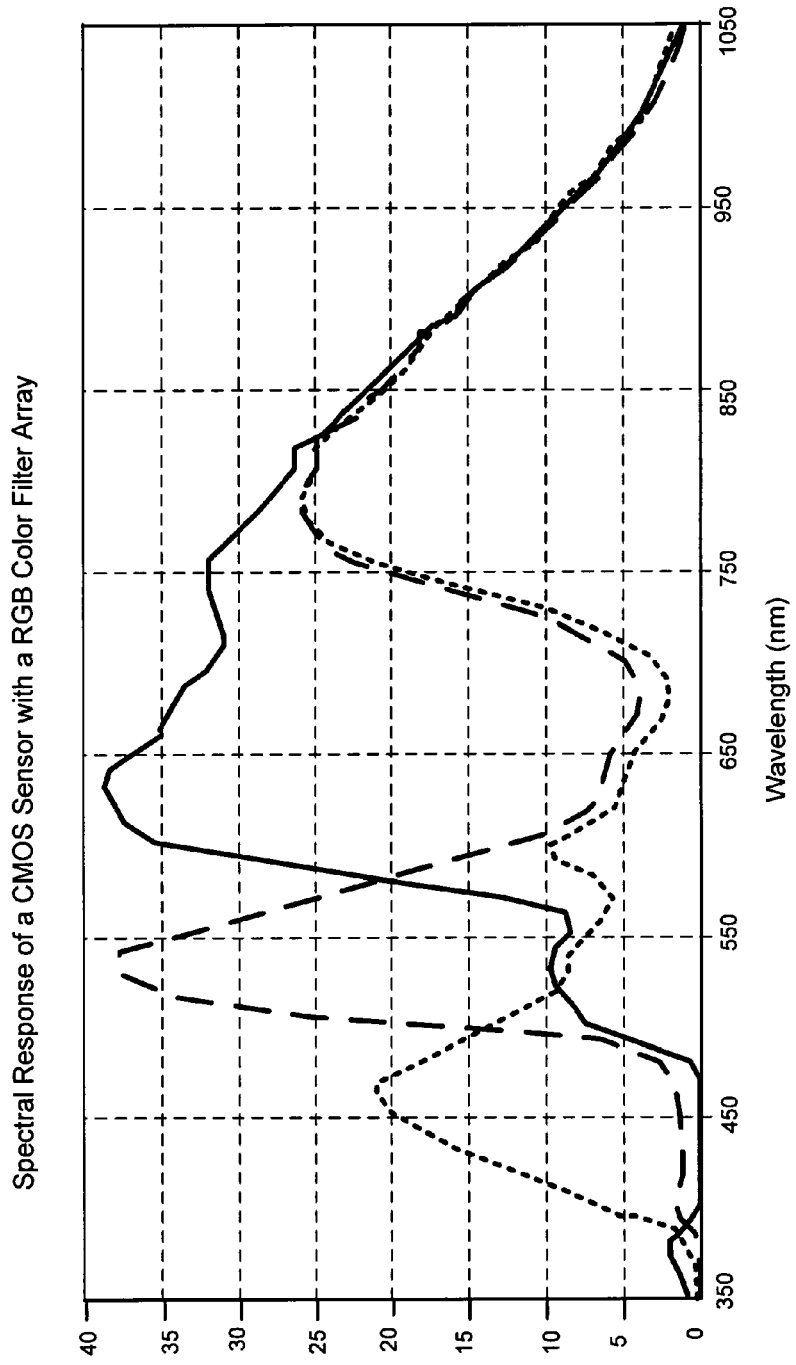
FIG. 4 is a graphical illustration of red, green and blue spectral responses of an exemplary CMOS sensor with a RGB color filter.
Figure 5:
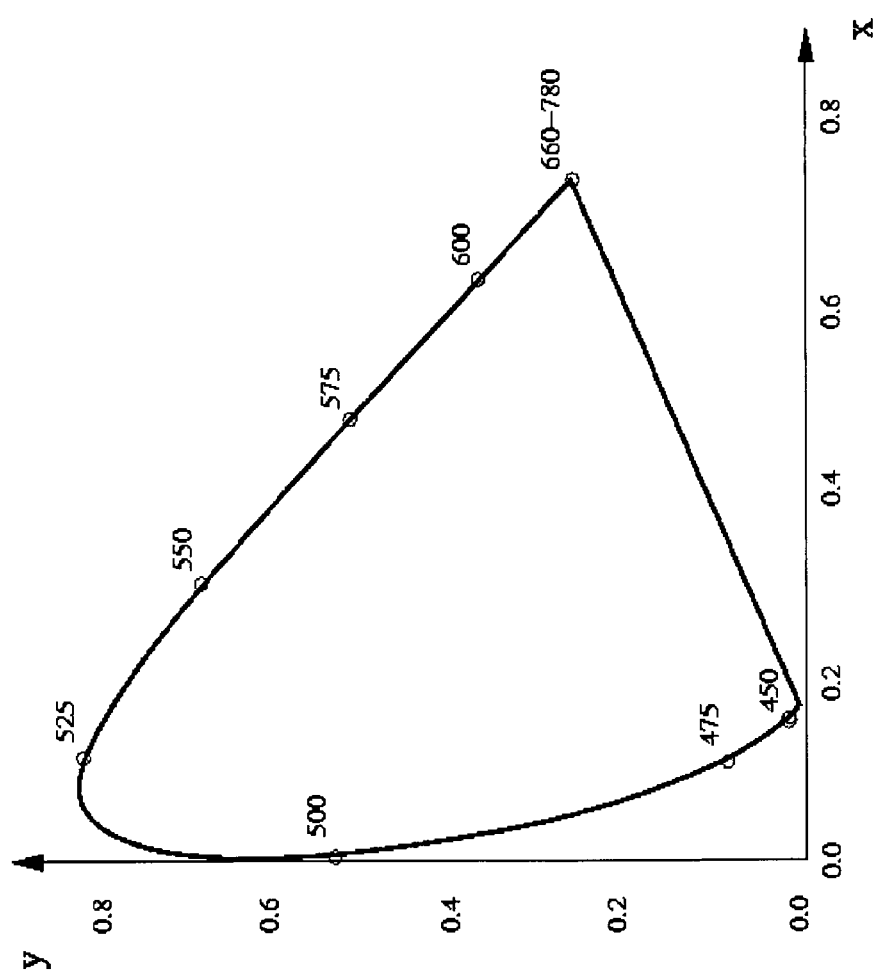
FIG. 5 is a reproduction of the 1931 CIE chromaticity diagram, which is a standard representation of the color gamut of human vision.

Imaging device 110 is configured to obtain color information from light 182 received from the scene via suitable optics (e.g., optics 150). Imaging device 110 may include an image sensor 120 (e.g., a solid state CCD or CMOS device having an array of pixels), which can sense light and convert it into data and/or signals. Further, image sensor 120 may be configured to sense a finite number N of spectral components of light 182 received from scene 180. For example, image sensor 120 may be coupled to a color filter array (e.g., a Bayer filter that passes red, green, or blue light to selected pixels in the sensor) to form spatially interlaced pixel grids that are each sensitive to a respective one of the N spectral components (e.g., red, green, and blue, respectively). Alternatively, each pixel of image sensor 120 may include a stack of sensing elements in which each sensing element is sensitive to a respective one of the N spectral components of light 182. Further, an embodiment of imaging device 110 may include a plurality of image sensors 120 with each sensor configured to sense a respective one of the N spectral components of light 182. For this embodiment, optics 150 may include, for example, a dichroic prism arrangement (not shown) to separate the different spectral components of light 182. In any case, imaging device 110 may have characteristic spectral response functions $R_n(\lambda)$, n=1, ... N, for sensing the N spectral components of light 182. (See e.g., FIG. 4). The wavelengths of the N spectral components may correspond to primary colors that define a color gamut of the imaging device. In some instances, two or more of the imaging device's characteristic spectral response functions $R_n(\lambda)$, n=1, ... N, which respectively correspond to the N detected spectral components may substantially overlap.

Figure 2:
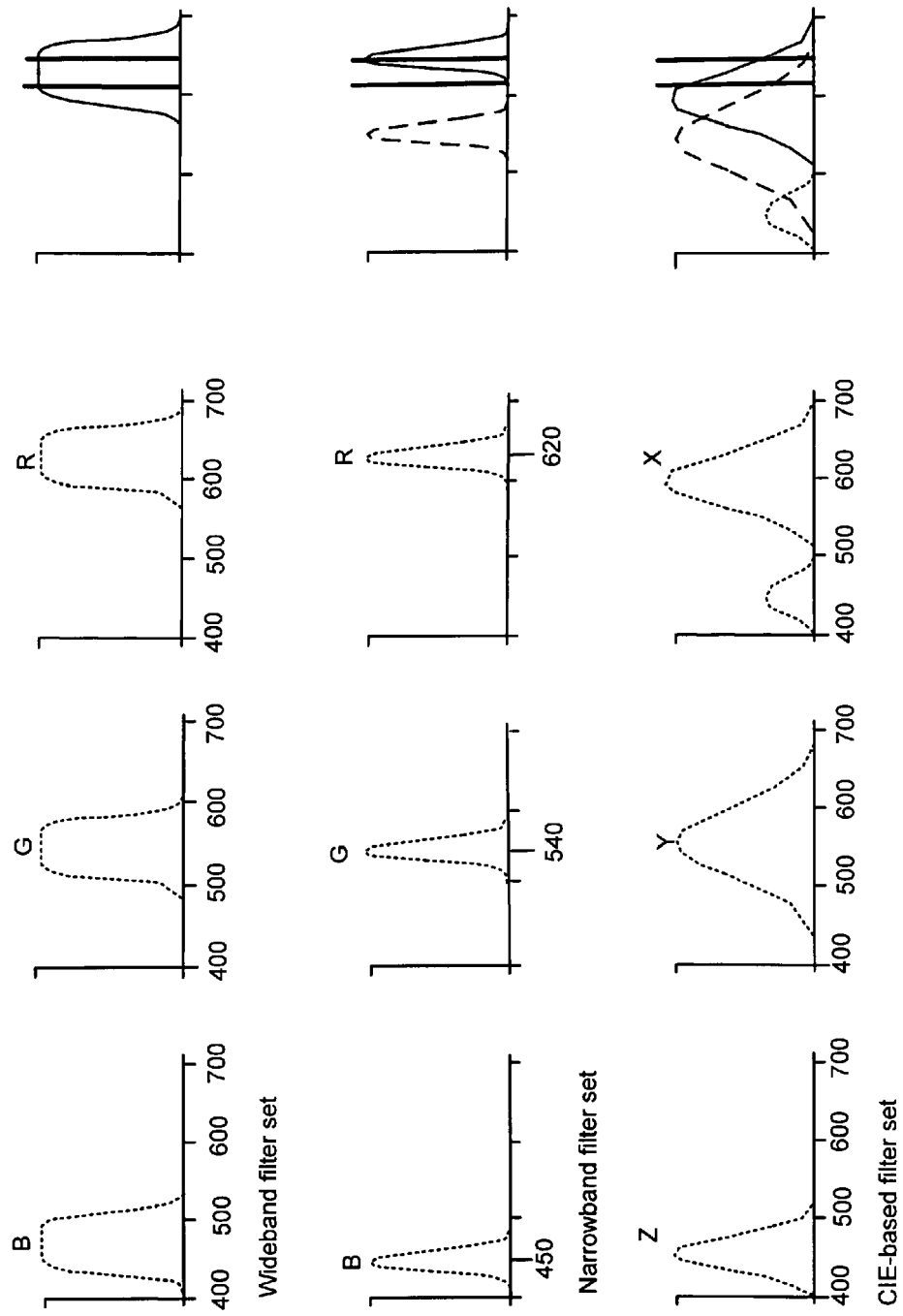
FIG. 2 is a schematic illustration of exemplary spectral distribution shapes of light that may be used to illuminate a scene, in accordance with the principles of the solutions described herein.

In system 100, imaging device 110 is operationally coupled to supplemental illumination device 140. The latter is operable to illuminate scene 180 in a second scene illumination with light 142 having a spectral distribution for which at least some qualifying information (e.g., wavelength(s) and/or relative intensity) is available (hereinafter "a known spectral distribution"). For example, supplemental illumination device 140 may provide substantially monochromatic light 142 at the one or more wavelength(s) $\lambda_k$, k=1, ... K for illuminating scene 180. The monochromatic light may, for example, be filtered light, diffraction grating separated light, or laser light. Alternatively or additionally, light 142 may include light with other spectral distribution shapes. FIG. 2 shows exemplary spectral distributions of light 142 formed by using wideband, narrowband, and CIE-based filter sets (146).

The operations of system 100 components (e.g., imaging device 110 and supplemental illumination device 140) may be controlled or co-ordinated by the optional control circuitry (e.g., controller 160). Further, the optional processing circuitry (e.g. data processor 170) in system 100 may be configured to receive, store, modify and/or process data and/or signals related to system 100 components and their operations including, for example, image or scene data sensed by image sensor 120, and data on the second scene illumination provided by supplemental illumination device 140. Elements or portions of the control circuitry and/or the processing circuitry may be disposed at any system 100 component (e.g., imaging device 110, and supplemental illumination device 140), at one or more external or remote locations, or distributed between system 100 components and the external locations.

In one embodiment of system 100, imaging device 110 is configured to sense the spectral components of light 182 received from scene 180 under first scene illumination and second scene illuminations. Further, in this embodiment, the processing circuitry may be configured to be responsive to signals and/or data corresponding to the sensed spectral components of light 182 received from scene 180 under the first and second scene illuminations, the characteristic spectral response functions of the imaging device, and the known spectral distribution of the light provided by the supplemental illumination device. The processing circuitry may be configured to process live imaging device data, or optionally to process such data at a later time (e.g., batch process such data).

A response of the processing circuitry may, for example, include computing signals and/or data corresponding to the SPD of scene 180 based at least in part on the sensed spectral components under the first scene illumination, and computing signals and/or data corresponding to a corrected or modified SPD based at least in part on additional spectral information in the sensed spectral components under the second scene illumination.

The processing circuitry may store, display, or transmit the computed data and/or signals to other processors or users. The computed SPD data and/or signals may be utilized to make a visual color image or rendition of the scene.

With respect to the various scene illuminations, supplemental illumination device 140 may be operable so that in the second scene illumination light with the known spectral distribution is added to the light of the first scene illumination. Alternatively, in the second scene illumination, light with the known spectral distribution may replace the light of the first scene illumination. More generally, system 100 may be configured so that a first of a plurality the scene illuminations includes ambient and/or artificial light provided by optional lighting unit 130, and supplemental illumination device 140 may be configured so that the first of the plurality of scene illuminations additionally includes the light with the known spectral distribution and a second of the plurality of scene illuminations includes only the light with the known spectral distribution.

Supplemental illumination device 140 may include any suitable number and type light sources (e.g., solid state lighting (SSL), light emitting diodes (LEDs), lasers, gas discharge lamps, incandescent lamps, fluorescent lamps, High Intensity Discharge (HID) lamps, gas discharge lamps, arc lamps, and combustion lamps). Suitable filter assemblies may be deployed to shape or select the spectral distribution of the emitted light and to direct the light toward scene 180. The light sources may include one or more substantially monochromatic light sources. An exemplary supplemental illumination device 140 includes an array of one or more light sources emitting light at one or more wavelength(s) $\lambda_k$, k=1, ... K, which may correspond to one or more different colors R, G, B, Y, C, M, ..., respectively. It should be noted that in some approaches two or more light sources may correspond to a given "color." For example, in some approaches the supplemental illumination may include two or more green light sources and/or two or more blue light sources, or any other combination of light sources. Each light source corresponding to a given color may have a spectral distribution different from that of one or more other light sources corresponding to the given color. For example, a first of the two or more green light sources may have a line center frequency different from a second of the two or more green light sources. Similarly, a first of the two or more green light sources may have a frequency width or range different from a second of the two or more green light sources.

Further, supplemental illumination device 140 may optionally include optics configured to shape or direct the supplemental light toward the scene. An exemplary supplemental illumination device 140 includes adaptive optics (e.g., an array of lenses or microlenses 144) coupled to the one or more light sources. The adaptive optics may be configured to direct light having a known spectral distribution onto at least a portion of the scene. Moreover, the adaptive optics may distribute supplemental light from supplemental illumination device 140 according to a selected distribution (e.g., a spatial distribution). For example, in one approach the adaptive optics may distribute supplemental illumination substantially uniformly across a portion of the field of view or may provide a gradient of intensity across a portion of the field of view. Additionally, the adaptive optics may vary from illumination to illumination, for example, responsive to the control circuitry and/or the processing circuitry. For example, during a first scene illumination, the adaptive optics may provide a uniform distribution and during a second scene illumination the adaptive optics may provide a nonuniform (e.g., Gaussian, gradient, line on-line off) or similar illumination in response to control and/or processing circuitry signals or commands.

In some approaches, the adaptive optics may provide different responses according to the spectral content of the supplemental illumination. For example, the adaptive optics may provide a first distribution of supplemental illumination during a first period of supplemental illumination (e.g., red wavelengths) and provide a second distribution of supplemental illumination during the second period of supplemental illumination (e.g., blue wavelengths). Where the adaptive optics are wavelength selective, the distribution of supplemental illumination for a first wavelength may differ from the distribution of supplemental illumination of a second wavelength, even during a common period of illumination. The different distributions of supplemental illumination are not necessarily limited to different "color" bands. For example, wavelength selective optics may provide a first distribution of supplemental illumination for a first green wavelength and a second distribution of supplemental illumination for a second green wavelength. Such narrowband optics may include narrowband filters, diffractive elements, or other wavelength selective structures or devices.

Figure 3:
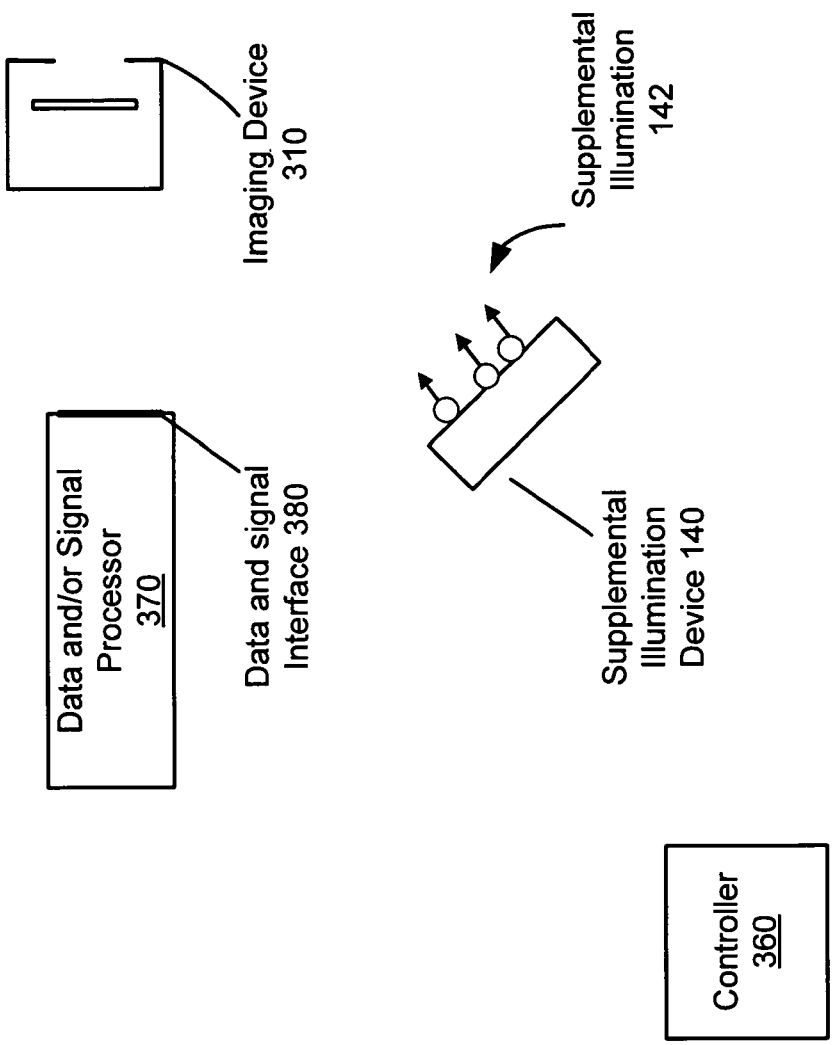
FIG. 3 is a block diagram illustrating an exemplary apparatus for modifying a spectral response representation of a scene obtained by an imaging device, in accordance with the principles of the solutions described herein.

With renewed reference to FIGS. 1-3, imaging device 110 may be configured to detect a finite number M of spectral components which correspond to M primary color components of a color gamut of the imaging device. Imaging device 110 may include one or more imaging pixels, each configured to detect at least one of a finite number M of spectral components corresponding to M primary components of a color gamut of the imaging device. For example, an imaging pixel may be configured to detect one of three spectral components corresponding to additive red, green, and blue primary color components, or to subtractive cyan, magenta, and yellow primary color components of a color gamut of the imaging device.

In the case where image sensor 120 is coupled to a spatial color filter array, each image sensor 120 pixel senses only the particular spectral component that is passed through to it by filter array. For such cases, the processing circuitry may be configured to compute additional "native" color values for the pixels by spatial interpolation of neighboring pixel data. Any suitable color interpolation algorithms may be deployed for this purpose. The processing circuitry may be further configured to use the native color values obtained by spatial interpolation of pixel values for the N detected spectral components of received light under the first scene illumination to provide a native color rendition of the scene under the first scene illumination, and to further modify this native color rendition according to the values of the detected spectral components of received light under the second scene illumination. Alternatively, the processing circuitry may be configured to modify pixel values for the N detected spectral components of received light under the first scene illumination according to the values of the detected spectral components of light transmitted from the scene under the second scene illumination. The processing circuitry may be further configured to compute a native color rendition of the scene based on, for example, spatial interpolation of the modified values of the detected spectral components of light transmitted from the scene under the first scene illumination.

For all cases of native color rendition (e.g., based on interpolation followed by modification, or vice versa), the processing circuitry may be further configured to apply a predetermined color correction routine to the native color rendition to yield a corrected color rendition of the scene. The predetermined color correction routine may be based on based on characteristics of imaging device optics (e.g., lens and filters).

FIG. 3 shows an apparatus 300 for modifying a spectral response representation of a scene obtained by an imaging device (e.g., device 310). Apparatus 300 may include a supplemental illumination device (e.g., supplemental illumination device 140) and/or data processing circuitry 370 (e.g., data and/or signal processor 170). Apparatus 300 may further include a control unit 360 coupled to the supplemental device and/or data processing circuitry 370. The supplemental illumination device may be operable to illuminate the scene with light 142 having a spectral distribution for which at least some qualifying information is available (e.g., "a known spectral distribution").

Control unit 360 may be configured to establish different types of scene illuminations provided by the supplemental illumination device and a corresponding number of different sets of spectral components of light to be detected by the imaging device for rendering a color image of a particular scene. Control unit 360 may be configured to determine the different types of scene illuminations and their sequence for rendering a color image of a particular scene in response to at least one of ambient light intensity, returned light characteristics, scene distance, and/or a control signal. A first of the distinct scene illuminations may include ambient and/or artificial light provided by an optional first illumination device, and a second of the distinct scene illumination may replace the ambient and/or artificial light with, or additionally include, light having a known spectral distribution.

An apparatus, which may be used in conjunction with imaging devices to obtain color images of a scene or to modify a detected spectral power distribution response of the scene to light, includes a supplemental illumination device operable to illuminate the scene with light having a known spectral distribution. The apparatus may additionally or alternatively include processing circuitry to render a color image of a scene or produce a signal indicative of a modified spectral power distribution response of the scene to light. The processing circuitry may be responsive a plurality of sets of spectral components of light received from the scene under a corresponding plurality of scene illuminations including at least one illumination with light having a known spectral distribution. The processing circuitry may render a color image of the scene, or modify a spectral power distribution response of the scene, based at least in part on the spectral components of light received from the scene under two different scene illuminations including one with light having a known spectral distribution.

Data processing circuitry 370 may include an interface 380 for receiving values of detected spectral components of light and other data and/or signals from the imaging device and the supplemental illumination device. Data processing circuitry 370 may be configured to be responsive to the data representative of the supplemental illumination device, data representative of characteristic spectral response functions $Rn(\lambda)$, n=1, ... N, corresponding to N spectral components detected by the imaging device, and data representative of light responses of the scene under distinct illuminations, at least one of which includes the light having a known spectral distribution, to produce data and/or a signal indicative of a modified spectral response representation of the scene.

Further, data processing circuitry 370 may be configured to render a color image of a scene by processing a plurality of sets of spectral components of light received from the scene under a corresponding plurality of scene illuminations. The sets may include at least a first and a second set corresponding to first and second scene illuminations that include light having an unknown spectral distribution and light having a known spectral distribution, respectively. The rendered color image of the scene may be based at least in part on the detected spectral components of light received from the scene under the first and second scene illuminations, the characteristic spectral response functions $R(\lambda)$ of the imaging device, and the known spectral distribution of light in the second scene illumination.

Furthermore, data processing circuitry 370 may be configured to compute a color rendition (e.g., a native color rendition) of the scene in spatial dimensions based on spatial interpolation of the detected spectral components of light received from the scene under the first scene illumination, and to modify the rendition based at least in part on values of the second set of spectral components of light corresponding to the second scene illumination.

Data processing circuitry 370 may be alternatively or additionally configured to modify values of the first set of spectral components of light corresponding to the first scene illumination at least in part according to values of the second set of spectral components of light corresponding to the second scene illumination, and to compute a color rendition of the scene in spatial dimensions based on the modified values, for example, by spatial interpolation of the modified values.

Additionally, data processing circuitry 370 may be configured to apply a predetermined color correction routine to color renditions of the scene (e.g., native or modified renditions) to yield corrected color renditions of the scene. The predetermined color correction routine may be based on imaging device optics.

Data processing circuitry 370 also may be configured to estimate a spectral distribution of light having an unknown spectral distribution in the first scene illumination based at least in part on the detected spectral components of light received from the scene under the first and second scene illuminations, the characteristic spectral response functions $R(\lambda)$ of the imaging device, and the known spectral distribution of light in the second scene illumination, and to further compute a color rendition of the scene (e.g., a native color rendition) based at least in part on the detected spectral components of light received from the scene under the first scene illumination, the estimated spectral distribution of such light in the first scene illumination, and the characteristic spectral response functions $R(\lambda)$ of the imaging device.

Methods for improving a color image or rendition of a scene may utilize additional information on the scene SPD developed by illuminating the scene with light having a known spectral distribution. FIGS. 6-8 show exemplary methods 600, 700 and 800 which utilize additional information on the scene SPD developed by illuminating the scene with light having a known spectral distribution to improve color images or scene renditions.

A method for modifying a first color image or rendition of a scene obtained under a first scene illumination, involves detecting a spectral response of the scene to the light having a known spectral power distribution under a second scene illumination, and modifying the first color image according to the detected spectral response of the scene.

FIG. 6 shows exemplary method 600 for improving a color image or scene rendition, which may have been obtained under a first scene illumination. The first scene illumination may, for example, have included light having an unknown spectral power distribution. The color image or rendition may be based on values of a finite number of spectral components of light received from the scene as detected by an imaging sensor, which has characteristic spectral response functions for detecting each of the finite number of spectral components. The first scene illumination may include ambient and/or artificial light.

Method 600 involves illuminating at least a portion of the scene in a second scene illumination with a light component having a known spectral power distribution (610), detecting a finite number of spectral components of light received from the scene under such illumination (620), and modifying the color image or rendition of the scene according to the detected values of the finite number of spectral components of light received from the scene under such illumination so that the first color image or rendition of the scene is improved (630). The modified image or scene rendition may be based on spatial interpolation of modified values of the detected spectral components of light received from the scene under the first scene illumination.

The light component having the known spectral power distribution may include substantially monochromatic light at one or more wavelength(s) $\lambda_k$, k=1, ... K. Adaptive optics may be used to direct the light component onto the portion of the scene, which, for example, may correspond to one or more pixels of an imaging device.

Method 600 may involve adding the light component having the known spectral power distribution to the first scene illumination under which the unmodified color image was obtained, or to other scene illuminations.

Method 600 may further involve illuminating the same or other portions of the scene under third or more illuminations with the same or other light components having known spectral power distributions (612), detecting values of the finite number of spectral components of light transmitted by the scene under the third or more scene illuminations (620), and modifying the color image or rendition of the scene according to the detected values of the finite number of spectral components of light received from the scene under one or more such illuminations (630). The number and sequence of scene illuminations may be pre-determined, or established within method 600, based on considerations of, for example, color image quality, and availability of light sources, imaging equipment and computing resources. The number and sequence of illuminations may be determined iteratively, for example, by consideration of the quality of iteratively modified color images. FIG. 6 shows an optional process 602 in method 600 for establishing the different types of scene illuminations, their sequence, and the corresponding number of different sets of spectral components of light to be detected by the imaging device for rendering an improved color image of a particular scene. The process may involve establishing different types of scene illuminations in response to at least one of ambient light intensity, returned light characteristics, scene distance, imaging device optics, or a control signal.

Method 600 may also include applying a predetermined color correction routine to the modified color image or rendition of the scene to yield a corrected color rendition of the scene. The predetermined color correction routine may be based on consideration of imaging device optics.

Further, method 600 may also include transmitting values of the spectral components of light detected by the imaging device to a data processing device, and at the data processing device, processing the values of spectral components of light to generate the improved color image or rendition of the scene. The processing may involve processing live imaging device data, or processing such data at a later time (e.g., batch processing such data). The data processing device may be at the imaging device or at a remote location.

Methods for rendering a color image of a scene in response to control or command signal may involve processing a plurality of sets of spectral components of light received from the scene under a corresponding plurality of scene illuminations, and rendering the color image of the scene based at least in part on the spectral components of light received from the scene under two scene illuminations, at least one of which includes light with the known spectral distribution FIG. 7 shows an exemplary method 700 for rendering a color image of a scene.

Method 700 includes, in response to the control signal, processing a plurality of sets of values of spectral components of light received from the scene under a corresponding plurality of scene illuminations (710). The control signal may be generated in response to at least one of ambient light intensity, returned light characteristics, imaging device optics, or imaging device-scene distance. The plurality of sets of values may include at least a first set corresponding to a first scene illumination and at least a second set corresponding to a second scene illumination that includes light having a known spectral distribution. Each set of values of spectral components of light received from the scene may have been detected by an imaging device having characteristic spectral response functions for detecting such spectral components.

Method 700 further includes rendering the color image of the scene based at least in part on the detected spectral components of light received from the scene under the first and second scene illuminations, the characteristic spectral response functions of the imaging device, and the known spectral distribution of light in the second scene illumination (720).

In method 700, rendering the color image (720) may include rendering a first color image of the scene in spatial dimensions based on spatial interpolation of the detected spectral components of light received from the scene under the first scene illumination. Further, rendering the color image (720) may involve modifying values of the first set of spectral components of light corresponding to the first scene illumination according to at least values of the second set of spectral components of light corresponding to the second scene illumination, and/or computing a native color rendition of the scene based on the modified values of the detected spectral components of light received from the scene under the first scene illumination.

Additionally or alternatively, in method 700, rendering the color image (720) may include estimating a spectral distribution of light in the first scene illumination based at least in part on the detected spectral components of light received from the scene under the first scene illumination and the characteristic spectral response functions of the imaging device, and further include modifying the estimated spectral distribution based at least in part on the detected spectral components of light received from the scene under the second scene illumination, the characteristic spectral response functions of the imaging device, and the known spectral distribution of light in the second scene illumination. Further, method 700 may include computing a native color rendition of the scene based at least in part on the modified estimated spectral distribution.

Method 700, like method 600, may further include applying a predetermined color correction routine to the color image (e.g., native or modified color image) to yield a corrected color image. Further, like in method 600, processing a plurality of sets of values (710) in method 700 may occur at least in part at the imaging device and/or a remote location with respect to the imaging device. Further, processing a plurality of sets of values (710) may involve processing live imaging device data and/or processing such at data at a later time.

Methods for adjusting a characteristic spectral response function of an imaging device while "in use" to image a scene, may involve recording a spectral response of the imaging device to illumination of at least a portion of the scene with a light component having a known spectral power distribution and adjusting the characteristic spectral response function of the in use imaging device according to the recorded spectral response.

Method 800 includes, in a second scene illumination, illuminating at least a portion of the scene with at least a light component having a known spectral power distribution (810). The light component having a known spectral power distribution may, for example, be substantially monochromatic light at one or more wavelength(s) $\lambda_k$, k=1, ... K. The second scene illumination may precede, succeed, add to, or modify the first scene illumination. Method 800 further includes recording a spectral response of the imaging device to light received from the scene under the second scene illumination (820), and adjusting a characteristic spectral response function of the imaging device according to the recorded spectral response of the imaging device to light received from the scene under the second scene illumination (830).

In method 800, adjusting the characteristic spectral response function of the imaging device (830) may include modifying values of the spectral components detected by the imaging device under the first scene illumination according to values of the spectral components detected by the imaging device under the second scene illumination. Alternatively or additionally, adjusting the characteristic spectral response function of the imaging device (830) may include rendering a first image of the scene based on values of the spectral components detected by the imaging device under the first scene illumination, and modifying the first image at least in part according to the values of the spectral components detected by the imaging device under the second scene illumination.

Method 800, like method 700, may be activated in response to the control signal, which is generated, for example, in response to at least one of ambient light intensity, returned light characteristics, imaging device optics, or imaging device-scene distance. Further, like in methods 600 and 700, method 800 may be implemented at least in part at the imaging device and/or a remote location with respect to the imaging device, and may involve processing live imaging device data and/or processing such at data at a later time.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Further, those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A system for acquiring spectral characteristics of a scene under a first scene illumination, wherein light received from the scene has a spectral power distribution (SPD) response characteristic of the scene, the system comprising:
   an imaging device configured to detect a finite number (N) of spectral components of light received from the scene, the imaging device having characteristic spectral response functions $R_n(\lambda)$, n=1, ... N, for detecting such spectral components and wherein:
      the image device comprises one or more imaging pixels, each configured to detect at least one of a finite number M of spectral components corresponding to M primary components of a color gamut of the imaging device; and
      an imaging pixel is configured to detect one of three spectral components corresponding to subtractive cyan, magenta, and yellow primary color components of a color gamut of the imaging device;
   a supplemental illumination device operable to provide a second scene illumination with light having a known spectral distribution; and
   processing circuitry coupled to the imaging device and responsive at least to:
      the detected spectral components of light received from the scene under the first and second scene illuminations;
      the characteristic spectral response functions of the imaging device; and
      the known spectral distribution of the light provided by the supplemental illumination device, to produce a signal indicative of the SPD response characteristic of the scene.

2. The system of claim 1, wherein the first scene illumination includes ambient and/or artificial light provided by an artificial lighting unit, and wherein the supplemental illumination device is operable so that the second scene illumination additionally includes the light with the known spectral distribution.

3. The system of claim 1, wherein the first scene illumination includes ambient and/or artificial light provided by an artificial lighting unit, and wherein the supplemental illumination device is operable so that in the second scene illumination the light with the known spectral distribution replaces the ambient and/or artificial light of the first scene illumination.

4. The system of claim 1, wherein the supplemental illumination device comprises an array of one or more light emitting diodes.

5. The system of claim 1, wherein the supplemental illumination device comprises an array of one or more substantially monochromatic light sources.

6. The system of claim 1, wherein the supplemental illumination device comprises an array of one or more light sources emitting light at the one or more wavelength(s) $\lambda_k$, k=1, ... K, respectively.

7. The system of claim 6, wherein the one or more light sources emitting light at the one or more wavelength(s) $\lambda_k$, k=1, ... K, correspond to one or more different colors R, G, B, Y, C, M, ..., respectively.

8. The system of claim 1, wherein the supplemental illumination device comprises a CIE-based filter set.

9. The system of claim 1, wherein the supplemental illumination device comprises an array of lenses or microlenses configured to direct light having the known spectral distribution on to at least a portion of the scene.

10. The system of claim 1, wherein the imaging device comprises at least one of a CMOS image sensor or a CCD image sensor.

11. The system of claim 1, wherein the imaging device is configured to detect a finite number M of spectral components corresponding to M primary components of a color gamut of the imaging device.

12. The system of claim 1, wherein an imaging pixel is configured to detect one of three spectral components corresponding to additive red, green, and blue primary color components of a color gamut of the imaging device.

13. The system of claim 1, wherein at least two of the imaging device's characteristic spectral response functions $R_n(\lambda)$, n=1, ... N, which respectively correspond to the N detected spectral components, substantially overlap.

14. The system of claim 1, wherein the processing circuitry is configured to compute a native color rendition of the scene based on spatial interpolation of the N detected spectral components of received light under the first scene illumination.

15. The system of claim 14, wherein the processing circuitry is configured to modify the native color rendition of the scene based on spatial interpolation the N detected spectral components of received light under the first scene illumination according to the values of the detected spectral components of received light under the second scene illumination.

16. The system of claim 14, wherein processing circuitry is configured to apply a predetermined color correction routine to the native color rendition of the scene to yield a corrected color rendition of the scene, wherein the predetermined color correction routine is based on imaging device optics.

17. The system of claim 1, wherein the processing circuitry is configured to modify values of the detected spectral components of received light under the first scene illumination according to the values of the detected spectral components of light transmitted from the scene under the second scene illumination.

18. The system of claim 17, wherein the processing circuitry is further configured to compute a native color rendition of the scene based on spatial interpolation of the modified values of the detected spectral components of light transmitted from the scene under the first scene illumination.

19. The system of claim 18, wherein the processing circuitry is further configured to apply a predetermined color correction routine to the native color rendition of the scene to yield a corrected color rendition of the scene, wherein the predetermined color correction routine is based on imaging device optics.

20. The system of claim 1, wherein at least a portion of the processing circuitry is disposed at a remote location with respect to the imaging device.

21. The system of claim 1, wherein the processing circuitry is configured to batch process imaging device data.

22. An apparatus, comprising:
   a supplemental illumination device operable to illuminate a scene with light having a known spectral distribution; and
   one or more imaging pixels, each configured to detect at least one of a finite number M of spectral components corresponding to M primary components of a color gamut of the apparatus, wherein each of the one or more imaging pixels are configured to detect one of three spectral components corresponding to subtractive cyan, magenta, and yellow primary color components of the color gamut;
   processing circuitry responsive at least to:

receive, from the one or more imaging pixels, data representative of a spectral power distribution from the scene under a first scene illumination; and receive, from the one or more imaging pixels, data representative of the known spectral distribution from the scene under a second scene illumination including the supplemental illumination; and produce a signal indicative of a modified spectral power distribution of the scene under a first scene illumination and the second scene illumination.

23. The apparatus of claim 22, wherein the light under a first scene illumination comprises ambient and/or artificial light, and wherein the supplemental illumination device is operable so that the second scene illumination additionally includes the light with the known spectral distribution.

24. The apparatus of claim 22, wherein the light under a first scene illumination comprises ambient and/or artificial light, and wherein the supplemental illumination device is operable so that in the second scene illumination the light with the known spectral distribution the light replaces the ambient and/or artificial light of the first scene illumination.

25. The apparatus of claim 22, wherein the supplemental illumination device comprises an array of one or more light emitting diodes.

26. The apparatus of claim 22, wherein the supplemental illumination device comprises an array of one or more substantially monochromatic light sources.

27. The apparatus of claim 22, wherein the supplemental illumination device comprises an array of one or more light sources emitting light at the one or more wavelength(s) $\lambda_k$, k=1, ... K, respectively.

28. The apparatus of claim 27, wherein the one or more light sources emitting light at the one or more wavelength(s) $\lambda_k$, k=1, ... K, correspond to one or more different colors R, G, B, Y, C, M, ..., respectively.

29. The apparatus of claim 22, wherein the supplemental illumination device comprises a CIE-based filter set.

30. The apparatus of claim 22, wherein the supplemental illumination device comprises an array of lenses or microlenses configured to direct light having the known spectral distribution onto at least a portion of the scene.

31. The apparatus of claim 22, further comprising a control unit coupled to the supplemental illumination device, wherein the control unit is configured to establish different types of scene illuminations for rendering a color image of a particular scene.

32. The apparatus of claim 22, wherein the data processing device further comprises an interface for receiving the representative data.

* * * * *